US006643519B1

United States Patent
Lundgren

(10) Patent No.: US 6,643,519 B1
(45) Date of Patent: Nov. 4, 2003

(54) TRANSMITTER POWER CONTROL METHOD AND APPARATUS

(75) Inventor: Carl W Lundgren, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 402 days.

(21) Appl. No.: 09/694,932

(22) Filed: Oct. 24, 2000

(51) Int. Cl.$^7$ .................. H04B 15/00; H04B 7/005; H04B 7/01

(52) U.S. Cl. .................. 455/505; 455/39; 455/63; 455/67.1; 455/67.3; 455/67.5; 455/69; 455/504; 455/505; 455/522

(58) Field of Search .................. 455/63, 69, 70, 455/522, 67.1, 67.3, 67.5, 505, 39, 504

(56) References Cited

U.S. PATENT DOCUMENTS

| | | | | |
|---|---|---|---|---|
| 5,267,262 A | * | 11/1993 | Wheatley, III .................. | 375/1 |
| 5,708,966 A | | 1/1998 | Al-Dhahir et al. | |
| 5,867,769 A | * | 2/1999 | Ichiyanagi .................. | 455/69 |
| 6,125,138 A | * | 9/2000 | Kumagai .................. | 375/219 |
| 6,341,214 B2 | * | 1/2002 | Uesugi .................. | 455/69 |

OTHER PUBLICATIONS

C. W. Lundgren and L. D. Spilman; A Method Of Providing Rain Margins For 18/30 GHZ Communications Satellites Without Increasing The Solar Power Requirement; Bell Telephone Laboratories, Inc., Holmdel, NJ 07733; 1973.

* cited by examiner

Primary Examiner—William Trost
Assistant Examiner—Stephen D'Agosta

(57) ABSTRACT

Automatic control of the power of the transmitters ($16_1$ and $16_2$) of a near-end-far-end transceiver pair ($12_1$–$14_1$) is achieved by first determining whether the strength of the signals received at near-end and far-end receivers ($18_1$ and $18_2$) of the near-end-far-end transceiver pair are simultaneously attenuated a prescribed value below received signal strength values measured during clear weather free-space conditions. If the received signal strengths are so attenuated, then transmission power of the near-end and far-end transceivers is increased by predetermined increments (or sequences or increments) to restore, but not exceed the strengths of the received signals to their respective signal strength values measured during clear weather free-space conditions. Conversely, if the above received signal strengths are determined not to be simultaneously attenuated by the said prescribed value, when one near-end or far-end received signal only is determined to be degraded (e.g., bit error ratio in excess of a given acceptable threshold value), then the transmission power of the far-end or near-end transceiver, respectively is increased either only sufficiently to restore the said degraded bit error ratio to acceptable, or until the predetermined upper limit of the allowable clear-weather transmitter power increase is reached. A variation of the latter limited automatic power control case (non-attenuated signals) accommodates the determination of degraded signals as received at both said transceivers, by increasing the transmission power of both said transceivers either only sufficiently to restore the said degraded bit error ratios to acceptable, or until the predetermined upper limit of the allowable clear-weather transmitter power increase is reached.

13 Claims, 2 Drawing Sheets

TRANSMITTER POWER CONTROL METHOD AND APPARATUS

BACKGROUND ART

Microwave, millimeter-wave, and optical over-the-air telecommunications systems suffer performance degradation due to signal attenuation by scattering and absorption of transmitted electromagnetic energy by air-borne water, such as rain, snow, and fog, as well as performance degradation arising from common-frequency (wavelength) interference, often referred to as co-channel interference. Methodologies and algorithms exist for increasing the transmitter power to overcome path attenuation due to rain and are operational in various satellite and terrestrial radio systems. Thus, many microwave and millimeter-wave terrestrial radio transport and distribution systems, available for 18-, 23-, 24-, 28- and 38-GHz broadband access radio links incorporate link management options affording some form of Automatic Transmitter Power Control (ATPC), and concomitant ATPC initiation and operation methodologies.

One key factor limiting the density of deployment of radio-based systems in a given coverage area is co-channel interference between radio links from nearby radio deployments of the same system. Depending upon line-of-site coupling exposures, co-channel interference may occur from more-distant radio links or radio distribution systems using the same channel, including "foreign" systems of other license holders. Because heavy rainfall severely attenuates 38-GHz signals (a result of the near half-wavelength resonant sizes of large raindrops), the current engineering practice for deploying 38-GHz broadband customer-access radio systems that lack power control is to set the transmitter powers high. Often times, the power is increased by a factor up to 10,000 times the minimum power required for acceptable clear-weather communications, irrespective of whether or not there are interfering signals. The resulting potential clear-weather interference generated is so great that co-channel radio links must be separated by large "frequency coordination" distances, lowering the achievable density of such radio deployments significantly.

There currently exist automatic transmitter power control techniques that can help minimize the interference environment, enabling somewhat closer-separated radio links sharing the same frequencies (channel pairs). For example, preset link-design values of transmitter powers at both ends of a link (e.g., modest, but sufficient powers to assure acceptable clear-weather performance and incidental interference) are increased significantly only during times when it is inferred from some "relevant" real-time on-site measurement that a link is experiencing heavy rainfall. The two-way information payload communications are sustained by significantly increased transmitter powers, overcoming the (assumed) rain attenuation, and this same rain attenuation is assumed to eliminate or minimize any interference to neighboring radio deployments.

However, depending upon the automatic transmitter power control methodology employed, certain conditions can arise wherein a link's transmitter power will increase dramatically even though clear weather surrounds the transmitters, causing potentially devastating interference to nearby co-channel links and to neighboring radio systems: An example is the present-day automatic transmitter power control ATPC algorithm that initiates increased "far-end" transmitter power whenever the perceived signal received at the "near-end" falls below a pre-set value. Should the latter perceived signal weaken significantly or disappear due only to electronic degradation of the "near-end" receiver, and not rain attenuation, then strong interference could result throughout the coverage area from the "far-end" transmitter controlled (inappropriately) to operate at high, and possibly the very possibly highest power. Additionally, the present day automatic transmitter power control techniques can operate to automatically increase transmitter powers at both ends of a radio link when a weakened signal is perceived, resulting in potentially disastrous interference, now doubled in impact, in the absence of actual rain attenuation.

An alternate automatic transmitter power control methodology involves making an on-site determination that a pre-set maximum degradation of the quality of the information payload has occurred, either instead of, or in addition to measuring the received signal strength. Again, depending upon the particular automatic transmitter power control methodology employed, degraded information payload quality may occur for other reasons beside rain attenuation. Such payload information degradation would then trigger high transmitter power at one or both ends of a radio link, causing severe clear-weather interference.

Co-channel radio interference itself is a common cause of degraded information payload quality in radio systems. Such interference could trigger a power increase in other nearby transmitters, again in clear weather. This leads potentially to an-area-wide "run-up" of transmitter power and hence, nearly ubiquitous interference, and not only sufficient to degrade or interrupt communications within the intended serving area, but could also interfere with nearby "foreign" (i.e., other license holders') systems. It is the collective interference power from multiple transmitters whose powers are each increased up to 10,000 times that required in the absence of rain that is at issue here.

A similar automatic transmitter power control requirement exists for the so-called "Free-Space Optical (including infra-red) Communications (FSOC) systems," wherein optical transmitter power is be minimized consistent with sustained communications during clear weather to facilitate eye-safety, promote longer laser lifetimes, reduce powering and heat dissipation/cooling requirements, etc. However significant power increases must occur in the presence of thick fog, dense smoke or very heavy rainfall to maintain communications. Again, it is inappropriate to increase optical transmitter power in the absence of high ambient optical attenuation. However, as discussed previously, such power-run up can nonetheless result from utilization of present-day automatic transmitter power control schemes.

BRIEF SUMMARY OF THE INVENTION

Briefly, in accordance with a preferred embodiment of the invention, a method is provided for controlling transmission power of a near-end and far-end transceiver pair in communication with each other. The method commences by determining whether the strength of the signals received at near-end and far-end transceivers are simultaneously attenuated a prescribed value below received signal strength values measured during clear weather free-space conditions. If the received signal strengths measured at the near-end and far-end transceivers are simultaneously attenuated below the prescribed value, then transmission power of the near-end and far-end transceivers is increased by predetermined increments (or sequences or increments) to restore, but not exceed the strengths of the received signals to their respective signal strength values measured during clear weather free-space conditions. Increasing the transmission power of the near-end and far-end transceivers only when the received signal strengths, as measured at the far-end and near-end receivers, respectively, are simultaneously attenuated serves to reduce the likelihood of co-channel interference during clear weather conditions.

DETAILED DESCRIPTION

Figure 1:
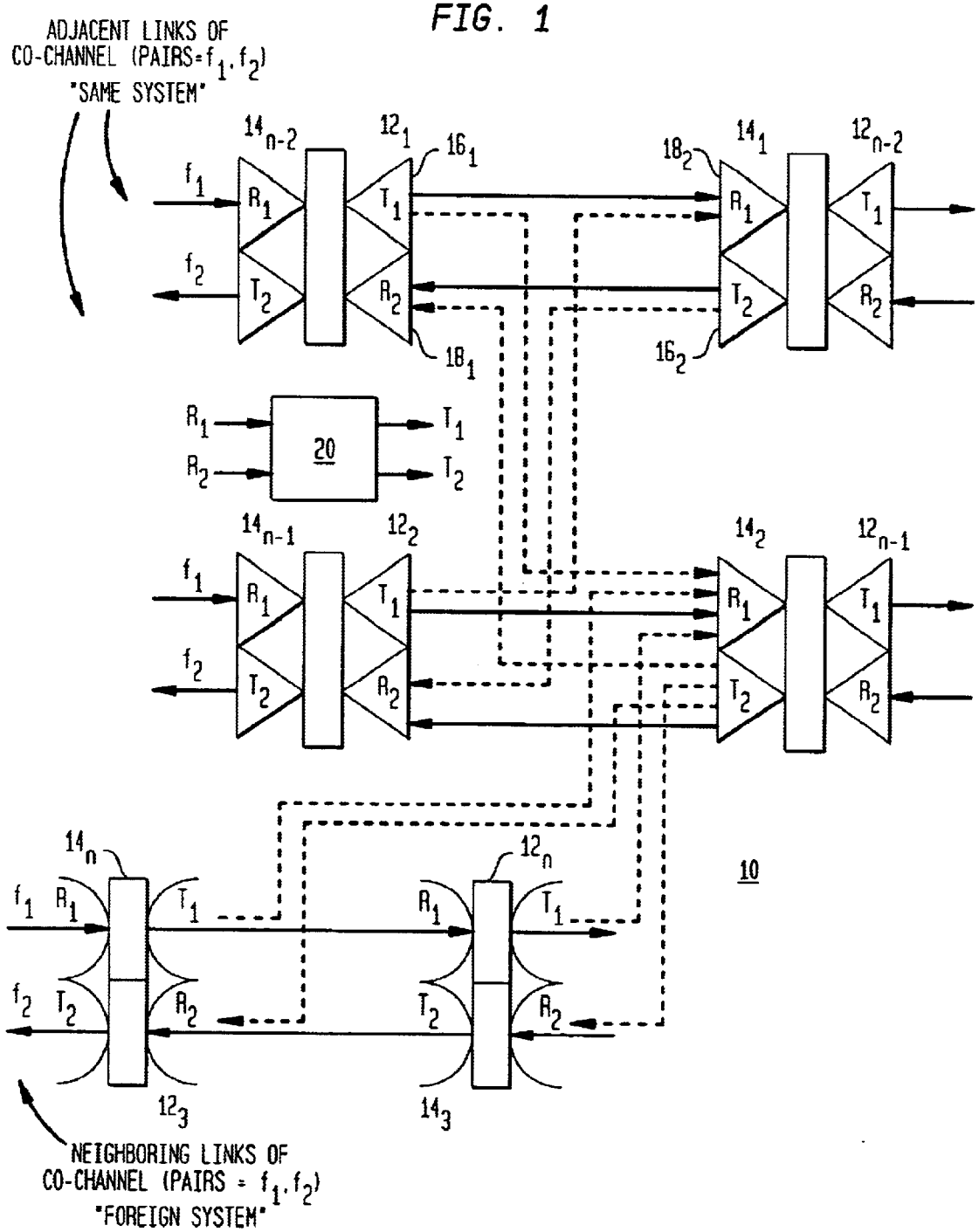
FIG. 1 discloses a block schematic diagram of a radio transmission system including a plurality of near-end and far-end and far-end transceiver pairs whose transmission power is automatically controlled in accordance with the invention.

FIG. 1 shows a block schematic of a radio transmission system comprising a near-end-far-end transceiver pairs $12_1$–$14_1$, $12_2$–$14_2$, . . . $12_{n-2}$–$14_{n-2}$, $12_{n-1}$$14_{n-1}$, and $12_n14_n$, where n is an integer greater than zero, and in the preferred embodiment of FIG. 1, n=5. Each near-end transceiver, such as near-end transceiver $12_1$ includes a transmitter $16_1$, and a receiver $18_1$, whereas each far-end transceiver, such as transceiver $14_1$ includes a transmitter $16_2$ and receiver $18_2$. The transmitter $16_2$ and receiver $18_2$ of each far-end transceiver are tuned to the same frequency as receiver $18_1$ and transmitter $16_1$, respectively, of the corresponding near-end transceiver. In practice, the receiver and transmitter of each transceiver operates within the microwave or millimeter wavelength radio frequency range, or within the optical wavelength range.

Under normal operation, the power of the transmitters $16_1$ and $16_2$ of each near-end-far-end transceiver pair remains below the level at which harmful co-channel interference will occur with other near-end-far-end transceiver pairs. However, present day automatic transmitter power control techniques sometimes can trigger significant increases in transmitter power during clear weather, free-space conditions, leading to co-channel interference that can have disastrous consequences.

In accordance with the invention, each near-end-far-end transceiver pair, (e.g., near-end-far-end transceiver pair $12_1$–$14_1$) includes a controller 20 for controlling the power of the transmitters $16_1$ and $16_2$, respectively, in accordance with the signals received at the receivers $18_1$ and $18_2$, respectively to reduce the incidence of significant transmission power run-up during clear weather, free-space conditions. As discussed in detail with respect to FIG. 2, the controller 20 monitors the strength of the signals received at the near-end and far-end receivers $18_1$ and $18_2$ transmitted by the far-end and near-end transmitters $16_2$ and $16_1$, respectively, of the transceiver pair $12_1$–$14_1$. If the signal strengths measured at the near-end and far-end receivers $18_1$ and $18_2$ are simultaneously attenuated below a prescribed value, then the controller 20 signals the near-end and far-end transmitters $16_1$ and $16_2$, respectively, to increase their power. The transmission power increases by predetermined increments (or sequences or increments) to restore, but not exceed, the strengths of the received signals to the values measured during clear weather free-space conditions. Increasing the transmission power of the near-end and far-end transceivers only when the received signal strengths measured at the far-end and near-end receivers are simultaneously attenuated below a prescribed value serves to reduce the likelihood of co-channel interference during clear weather conditions.

Figure 2:
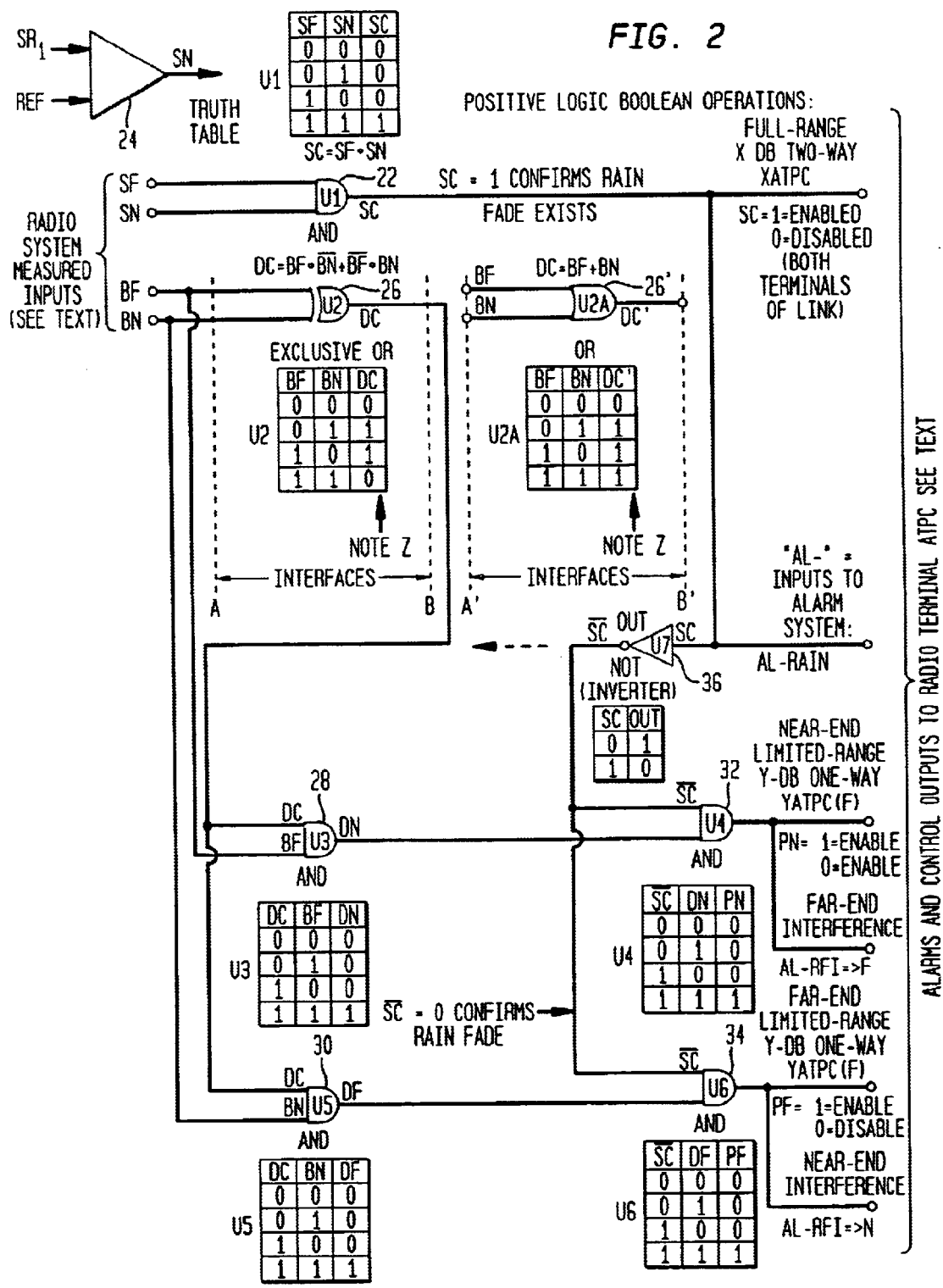
FIG. 2 discloses a block schematic diagram of a controller for use with a near-end-far-end transceiver pair of FIG. 1 for automatically controlling the transmitter power.

FIG. 2 shows the details of the controller 20. In its simplest form, the controller 20 comprises a two-input AND gate 22, which receives logic signals SF and SN at its first and second inputs, respectively. The signals SF and SN transition to a logic "1" level value when the strength of the signal received at a corresponding one of the far-end and near-end receivers $18_2$ and $18_1$ (FIG. 1), respectively, falls below the received signal strength value measured during clear weather free-space conditions by a prescribed value. As discussed, the received signals may comprise optical or radio frequency, signals depending on the corresponding transmitter, so the signals SF and SN represent the optical or radio frequency signal strength, respectively. In practice, the signal SN is produced at the output of a logical comparator 24 having a first input signal $SR_1$ representing the near-end received signal strength, and a second input signal Ref, representing the received signal strength value measured during clear weather free-space conditions. If SRI is attenuated below Ref by a prescribed value, (e.g., >5 dB), then the output signal SN is a logical "1" level, otherwise, the signal SN has a logical zero value. The signal SF is produced in a similar manner.

The logic gate 22 produces an output signal SC at a logical "1" level only when both the signals SF and SN are each at a logical "1". Otherwise, the signal SC remains at a logical zero level. Thus, the signal SC produced by the logic gate 22 only transitions to a logic "1" state when the signal strengths measured at the near-end and far-end receivers $18_1$ and $18_2$, respectively, of FIG. 1 are simultaneously attenuated below a prescribed value, as will occur when rain, or other atmospheric conditions, cause a signal fade.

In accordance with the invention, the signal SC produced by the controller 20 controls the power of the near-end and far-end transmitters $16_1$ and $16_2$ of FIG. 1. Typically, the signal SC serves to trigger the automatic transmitter power control of the near-end and far-end transmitters $16_1$ and $16_2$ to increase transmission power by predetermined increments (or sequences or increments), typically, by up to as much as 40 dB (or more), depending upon the local rainfall statistics (requirement for sustained communications) and the controlled transmitters' power capabilities. By increasing the transmitter power in this manner, the received signal power strength will return to, but not exceed the strengths measured during clear weather free-space conditions.

As discussed, the signal SC transitions to a logical "1" level when both the signals SF and SN transition to a logic "1", as will occur when a rain fade exists. Thus, in addition to using the SC signal to trigger an increase in the near-end and far-end transmission powers, the SC signal also functions as a rain indicator for various alarms or the like (not shown).

In accordance with another aspect of the invention, the controller 20 can also trigger a more limited automatic transmitter power controlled transmitter power increase (e.g., 5 to 10 dB) during clear weather free-space conditions but only in response to an increase in the bit error ratio(s) of the received signal(s). To accomplish such triggering, the preferred controller 20 embodiment may include a logic gate 26 typically in the form of an exclusive OR (XOR) gate that receives signals BF and BN at its first and second inputs. The signals BN and BF are logical values that transition to a logical "1" level when the error ratio of the signal received at the near-end and far-end receivers $16_1$ and $16_2$, respectively, exceeds a prescribed bit error ratio. In practice, each of the signals BN and BF can be obtained by logically comparing the actual bit error ratio to a reference value, in much the same way the logical signal strength value SN is derived. The output signal of the XOR gate 26 (designated by the term DC) transitions to a logic "1" level only when either (but not both) of the signals BF and BN transition to a logic "1" level.

Each of a pair of two-input AND logic gates 28 and 30 receives a separate one of the signals BF and BN at its first input, respectively, and the signal DC at its second input. The output signal of the gate 28, represented by the term DN, only transitions to a logic "1" level when both the signals BF and DC are at a logic "1" level. Otherwise, the signal DN remains at a logic zero level. By the same token, the output signal of the AND gate 30, represented by the term DF, only transitions to a logic "1" level when both the signals DC and BN are at a logic "1" level. Otherwise, the signal DF remains at a logic zero level.

Each of a second pair of two-input AND gates 32 and 34, respectively receives the signal DN at its first input, and a signal $\overline{SC}$ at its second input. The signal $\overline{SC}$ represents the output signal of an inverter (NOT gate) 36 that receives the signal SC at its input. The output signal of the AND gate 32, represented by the term PN, transitions to a logic "1" level only when both the signals $\overline{SC}$ and DN are both at a logic "1" level. Thus, the signal PN only transitions to a logic "1" level when a bit error condition exists at the far-end receiver in the absence of rain fade. The signal PN serves to trigger a limited power increase at the near-end transmitter (e.g., transmitter 16$_1$) in response to an increase in bit error ratio of the signal received at the far-end receiver. Such a bit error ratio increase at the far-end receiver usually occurs as a result of far-end interference, and thus the signal PN may also serve to indicate the occurrence of far-end interference for alarm purposes.

The output signal of the AND gate 34, represented by the term PF, transitions to a logic "1" level only when both the signals $\overline{SC}$ and DF are both at a logic "1" level. Thus, the signal PF only transitions to a logic "1" level when a bit error condition exists at the near-end receiver in the absence of rain fade. The signal PF serves to trigger a limited power increase at the far-end transmitter (e.g., transmitter 16$_2$) in response to an increase in bit error ratio of the signal received at the near-end receiver. Such a bit error ratio increase at the near-end receiver usually occurs as a result of near-end interference, and thus the signal PN may also serve to indicate the occurrence of such near-end interference for alarm purposes.

The combination of the logic gates 26–36 serve to trigger a limited increase in near-end and far-end transmitter power separately during clear-weather, free-space conditions, in response to far-end and near-end interference, respectively, but not an increase when both far-end and near-end interference occurs. In practice, the power increases until either (1) the degraded received bit error ratio is restored to an acceptable level; or (2) the predetermined upper limit of the allowable clear-weather transmitter power increase is reached (e.g., 5 to 10 dB). When both far-end and near-end interference occurs, as occurs when both BF and BN transition to a logic "1" level, the signal DC remains at a logic zero level. Under such circumstances, the signals PN and PF remain at a logic zero level, disabling any near-end and far-end transmitter power increase. Under most conditions, disabling simultaneous limited near-end and far-end transmitter power increases in response to the existence of simultaneous far-end and near-end interference, respectively, reduces the possibility of undesirable power-run up and co-channel interference.

However, circumstances may exist when limited near-end and far-end transmitter increases should occur simultaneously in response to a simultaneous increase in the near-end and far-end received bit error rates. Under such circumstances, OR gate 26' will replace XOR gate 26. The OR gate 26' produces an output signal DC' that transitions to a logic "1" level when either or both signals BF and BN transition to a logic "1" level. (In contrast, the output signal DC of the XOR gate 26 only transitions to a logic "1" level when either signals BF and BN reach a logic "1" level, but not when both signals reach a logic "1" level.) As a consequence of substituting the OR gate 26' for the XOR gate 26, the signals PF and PN both become enabled (i.e., both reach a logic "1" level) upon the simultaneous occurrence of near-end and far-end interference during clear weather, free-space conditions. Thus, substituting the OR gate 26' for the XOR gate 26 will allow a simultaneous limited increase in near-end and far-end transmitter power upon the simultaneous occurrence of near-end and far-end interference during clear weather, free-space conditions.

The foregoing describes a technique for achieving automatic transmitter power control that operates to achieve a full-range power increase during a rain fade, and limited near-end and far-end transmitter power increase upon the occurrence of far-end and near-end interference, respectively, during clear weather, free-space conditions.

The above-described embodiments merely illustrate the principles of the invention. Those skilled in the art may make various modifications and changes that will embody the principles of the invention and fall within the spirit and scope thereof. For example, while the structure of the controller 20 has been described in terms of discrete logic gates, the controller could readily be implemented using a combination of a general purpose or special purpose computer, a programmed microprocessor or microcomputer, an application specific integrated circuit (ASIC), or a programmable logic device (PLA, PLD, FPGA, PAL or the like.

What is claimed is:

1. A method for automatically controlling transmission power of a near-end and far-end transceiver pair in communication with each other, comprising the steps of:

determining if the near-end and far-end received signals from the far-end and near-end transceivers, respectively, have signal strengths that are simultaneously attenuated by a prescribed amount below their respective values occurring during clear weather fee-space conditions; and if so, then increasing the transmission power of the near-end and far-end transceivers as necessary to restore, but not exceed, the strengths of the near-end and far-end received signals to their respective values occurring during clear weather free-space conditions, wherein during intervals while the signal strengths of both the near-end and far-end signals are not simultaneously attenuated by a prescribed amount below their respective values occurring during clear weather free-space conditions, the following steps are performed:

determining if the bit error ratio of only one of the near-end and far-end received signals from the far-end and near-end transceivers, respectively, is degraded such that there are errors in excess of an acceptable threshold for a given service during clear weather free-space conditions; and if so, then triggering a limited increase in the transmission power of a corresponding far-end or near-end transceiver, respectively to reduce measured bit errors in said one degraded received signal until (1) the said degraded received bit error ratio is restored to acceptable levels, or (2) a predetermined upper limit of allowable clear-weather transmitter power increase is reached.

2. The method according to claim 1 including the step of providing alarm information that interference to-, malfunction of—the said degraded transceiver is likely.

3. A method for automatically controlling transmission power of a near-end and far-end transceiver pair in communication with each other, comprising the steps of:

determining if the near-end and far-end received signals from the far-end and near-end transceivers, respectively, have signal strengths that are simultaneously attenuated by a prescribed amount below their respective values occurring during clear weather free-space conditions; and if so, then increasing the transmission power of the near-end and far-end transceivers as necessary to restore, but not exceed, the strengths of the near-end and far-end received signals to their respective values occurring during clear weather free-space conditions wherein during intervals while the signal strengths of both the near-end and far-end signals are not simultaneously attenuated by a prescribed amount below their respective values occurring during clear weather free-space conditions, the following steps are performed:

determining if the bit error ratios of both of the near-end and far-end received signals from the far-end and near-end transceivers, respectively, are degraded such that there are errors in excess of the acceptable threshold for a given service during clear weather free-space conditions; and if so, then triggering a limited increase in the transmission powers of both the near-end and far-end transceivers, respectively to reduce measured bit errors in said degraded received signals until (1) the said degraded received bit error ratios are restored to acceptable levels, or (2) a predetermined upper limit of allowable clear-weather transmitter power increase is reached.

4. The method according to claim 3 further including the step of providing alarm information that interference to-, or malfunction of—both transceivers is likely.

5. Apparatus for automatically controlling transmission power of a near-end and far-end transceiver pair in communication with each other, comprising:

a controller for determining if the near-end and far-end received signals from the far-end and near-end transceivers, respectively, have signal strengths that are simultaneously attenuated by a prescribed amount below their respective values occurring during clear weather free-space conditions; and if so, then increasing the transmission power of the near-end and far-end transceivers as necessary to restore, but not exceed, the strengths of the near-end and far-end received signs to their respective values occurring during clear weather free-space conditions, and providing alarm information that rain attenuation is likely to be occurring between said transceivers wherein during intervals while the signal strengths of both the near-end and far-end signals are not simultaneously attenuated by a prescribed amount below their respective values occurring during clear weather free-space conditions, the controller determines if the bit error ratio of only one of the near-end and far-end received signals from the far-end and near-end transceivers, respectively, is degraded to a value in excess of an acceptable threshold for a given service during clear weather free-space conditions; and if so, then triggers a limited increase in the transmission power of a corresponding far-end or near-end transceiver, respectively to reduce the measured bit errors in said one degraded received signal until (1) the said degraded received bit error ratio is restored to a value at or below the acceptable threshold, or (2) a predetermined upper limit of allowable clear-weather transmitter power increase is reached, and providing alarm information that interference to-, or malfunction of—the said degraded transceiver is likely.

6. The apparatus according to claim 5, wherein the predetermined upper limit of the allowable clear-weather transmitter power increase is between 5–10 dB.

7. Apparatus for automatically controlling transmission power of a near-end and far-end transceiver pair in communication with each other, comprising:

a controller for determining if the near-end and far-end received signals from the far-end and near-end transceivers, respectively, have signal strengths that are simultaneously attenuated by a prescribed amount below their respective values occurring during clear weather free-space conditions; and if so, then increasing the transmission power of the near-end and far-end transceivers as necessary to restore, but not exceed, the strengths of the near-end and far-end received signals to their respective values occurring during clear weather free-space conditions, and providing alarm information that rain attenuation is likely to be occurring between said transceivers wherein during intervals while the signal strengths of both the near-end and far-end signals are not simultaneously attenuated by a prescribed amount below their respective values occurring during clear weather free-space conditions, the controller determines if the bit error ratio of both of the near-end and far-end received signals from the far-end and near-end transceivers, respectively, are degraded to values in excess of acceptable thresholds for given services during clear weather free-space conditions; and if so, then triggers a limited increase in the transmission power of both corresponding far-end and near-end transceivers, respectively to reduce the measured bit errors in said degraded received signals until (1) the said received bit error ratios are restored to at or below the acceptable thresholds, or (2) predetermined upper limits of the allowable clear-weather transmitter power increase are reached and providing alarm information that interference to-, malfunction of—both said transceivers is likely.

8. The apparatus according to claim 7 wherein the controller further includes:

a two-input exclusive OR gate or producing an output signal at a prescribed logic level only when either but not both of a first and second input signals (BF and BN, respectively) representing far-end and near-end measured (or indirectly inferred) bit error ratio deviations from acceptable service threshold, exceeds a prescribed logic value;

a first two-input AND gate receiving the output signal of the exclusive OR gate at a first input and the signal BF at the second input for producing an output signal DN only when the exclusive OR gate output signal and the signal BF are at a prescribed logic level;

a second two-input AND gate receiving the output signal of the exclusive OR gate at a first input and the signal BN at the second input for producing an output signal DF only when the exclusive OR gate output signal and the signal BN are at a prescribed logic level;

a third two-input AND gate receiving DN at a first input, and receiving at its second input a signal $\overline{SC}$ which transitions to a prescribed logic value in response to clear weather, free space conditions, the third AND gate producing an output signal PN which transitions to a prescribed logic value to trigger a limited power increase in the near-end transmitter only when the signals DN and $\overline{SC}$ transition to the prescribed logic value; and a fourth two-input AND gate receiving DF at a first input, and receiving at its second input the signals $\overline{SC}$, the fourth AND gate producing an output signal PF which transitions to a prescribed logic value to trigger a limited power increase in the far-end transmitter only when the signals DF and $\overline{SC}$ transition to the prescribed logic value.

9. The apparatus according to claim 7, wherein the predetermined upper limits of the allowable clear-weather transmitter power increase are between 5–10 dB.

10. A method for automatically controlling transmission power of a near-end and far-end transceiver pair in communication with each other, comprising the steps of:

determining if the near-end and far-end received signals from the far-end and near-end transceivers, respectively, have signal strengths that are simultaneously attenuated by a prescribed amount below their respective values occurring during clear weather free-space conditions; and if so, then increasing the transmission power of the near-end and far-end transceivers as necessary to restore, hut not exceed, the strengths of the near-end and far-end received signals to their respective values occurring during clear weather free-space conditions, wherein during intervals while the signal strengths of both the near-end and far-end signals are not simultaneously attenuated by a prescribed amount below their respective values occurring during clear weather free-space conditions, the following steps are performed:

determining in only one of the near-end and far-end received signals from the far-end and near-end transceivers, respectively, is degraded in excess of an acceptable threshold for a given service during clear weather free-space conditions; and if so, then triggering a limited increase in the transmission power of a Corresponding far-end or near-end transceiver, respectively to reduce the degradation in the received signal until
(1) the said received signal is restored to an acceptable level, or
(2) a predetermined upper limit of the allowable clear-weather transmitter power increase is reached.

11. The method according to claim 10 including the step of providing alarm information that interference to-, or malfunction of—the said degraded transceiver is likely.

12. A method for automatically controlling transmission power of a near-end and far-end transceiver pair in communication with each other, comprising the steps of:

determining if the near-end and far-end received signals from the far-end and near-end transceivers, respectively, have signal strengths that are simultaneously attenuated by a prescribed amount below their respective values occurring during clear weather free-space conditions; and if so, then increasing the transmission power of the near-end and far-end transceivers as necessary to restore, but not exceed, the strengths of the near-end and far-end received signals to their respective values occurring during clear weather free-space conditions wherein during intervals while the signal strengths of both the near-end and far-end signals are not simultaneously attenuated by a prescribed amount below their respective values occurring during clear weather free-space conditions, the following steps are performed:

determining if the both the near-end and far-end received signals from the far-end and near-end transceivers, respectively, are degraded in excess of acceptable thresholds for a given service during clear weather free-space conditions; and if so, then triggering a limited increase in the transmission powers of both the near-end and far-end transceivers, respectively to reduce the degradation in the received signals until
(1) the said degraded signals are restored to acceptable levels, or
(2) a predetermined upper limit of allowable clear-weather transmitter power increase is reached.

13. The method according to claim 12 further including the step of providing alarm information that interference to-, or malfunction of—both transceivers is likely.

* * * * *